(12) United States Patent
Anderson et al.

(10) Patent No.: US 7,792,849 B2
(45) Date of Patent: Sep. 7, 2010

(54) DATABASE GRAPHICAL COMPARISON TOOL

(75) Inventors: Mark John Anderson, Oronoco, MN (US); Christopher Julius Brandt, Rochester, MN (US); David Stanley Charron, Rochester, MN (US); James Michael Flanagan, Rochester, MN (US); Scott Forstie, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 252 days.

(21) Appl. No.: 11/548,312

(22) Filed: Oct. 11, 2006

(65) Prior Publication Data

US 2008/0091669 A1   Apr. 17, 2008

(51) Int. Cl.
*G06F 17/30* (2006.01)
(52) U.S. Cl. .................. 707/758; 707/802; 715/764
(58) Field of Classification Search ............ 707/609, 707/705, 758, 802; 715/713, 764
See application file for complete search history.

(56) References Cited

U.S. PATENT DOCUMENTS

| | | | |
|---|---|---|---|
| 6,236,993 B1 * | 5/2001 | Fanberg | 707/6 |
| 6,374,239 B1 * | 4/2002 | Anderson et al. | 707/4 |
| 7,234,112 B1 * | 6/2007 | Brown et al. | 715/713 |
| 2003/0065648 A1 * | 4/2003 | Driesch et al. | 707/2 |

OTHER PUBLICATIONS

Sneed et al., Testing a Web Application, 2004, IEEE, pp. 1-9.*
Bala et al., Dynamo: A Transparent Dynamic Optimization System, 2000, ACM, pp. 1-12.*
Chang et al, A Graphical Environment for Change Detection in Structured Documents, 1997, IEEE, pp. 536-541.*
Chawathe et al, Change Detection in Hierarchically Structured Information, 1996, ACM, pp. 493-504.*

* cited by examiner

*Primary Examiner*—Fred I Ehichioya
(74) *Attorney, Agent, or Firm*—Martin & Associates, LLC; Derek P. Martin (57) ABSTRACT

A database graphical comparison tool allows comparing database items that include multiple database statements and graphically displaying the comparison results in a ranked list of database statements. The graphical comparison tool includes a graphical user interface that allows a user to easily configure the tool for both manual and automatic (or scheduled) comparisons. In addition, the user may specify one or more actions that may be autonomically performed when the comparison of database items meets predefined criteria. Database items that may be compared using the database graphical comparison tool include optimizer monitors and plan cache snapshots.

9 Claims, 12 Drawing Sheets

Compare SQL Performance Data - Z2332p1

| monitor1 — 710 | monitor2 — 720 |
|---|---|
| Total Statements Analyzed: 2 | Total Statements Analyzed: 2 |
| Unmatched statements: 1 | Unmatched statements: 1 |
| [Show Statements] | [Show Statements] |

| Matching Statements | monitor1 | monitor2 | percent |
|---|---|---|---|
| [−] select * from qiws.qcustcdt | 730 | | |
| • Maximum Runtime | 0.037528 | 0.074960 | -99.74 |
| • Average Runtime | 0.030496 | 0.049578 | -62.57 |
| • Minimum Runtime | 0.023280 | 0.015272 | 52.43 |
| • Maximum Open Time | 0.037360 | 0.074784 | -100.17 |
| • Maximum Fetch Time | 0.000056 | 0.000056 | 0 |
| • Maximum Close Time | 0.000112 | 0.000120 | -7.14 |
| • Statement Usage Count | 3 | 3 | 0 |
| • Average Table Scans | 1 | 1 | 0 |
| • Average Indexes Used | 0.000 | 0.000 | 0 |
| • Full Indexes Created | 0 | 0 | 0 |
| • Sparse Indexes Created | 0 | 0 | 0 |
| • Indexes from Index Created | 0 | 0 | 0 |
| • Average Index Creates Advised | 0.000 | 0.000 | 0 |
| • Average Temporary Tables | 0.000 | 0.000 | 0 |
| • Average Sorts | 0.000 | 0.000 | 0 |
| • Average Bitmap Creates | 0.000 | 0.000 | 0 |
| • Average MQTs Used | 0.000 | 0.000 | 0 |
| • Maximum Table Rows | 12 | 12 | 0 |
| • Maximum Estimated Rows | 12 | 12 | 0 |
| • Maximum Rows Returned | 12 | 12 | 0 |
| • Average Table Rows | 12 | 12 | 0 |

New Snapshot of SQL Plan Cache - Y0551p1

Name: autosnap-092206-8am
Schema: BSCHEMA

○ Include all plan cache entries
◉ Include plan cache entries that meet the following criteria:
  ☐ Minimum runtime for the longest execution:
    [ 0 ] [ seconds ▽ ]
  ☑ Queries run after this date and time:
    [ Sep 22, 2006 ] [ 08:00 AM ]
  ☐ Top 'n' most frequently run queries
    [ 0 ]
  ☐ Top 'n' queries with largest total accumulated runtime
    [ 0 ]
  ☐ Queries ever run by user:
    [         ]
  ☐ Queries currently active
  ☐ Queries with index advised
  ☐ Queries with statistics advised
  ☑ Include queries initiated by the operating system
  ☑ Queries that use or reference these objects:

| Schema | Table |
|---|---|
| bundledata | aaix1mp001 |
|  |  |
|  |  |

☐ SQL statement contains:
    [                                          ]

[ OK ]  [ Cancel ]  [ Help ]

New Snapshot of SQL Plan Cache - Y0551p1

Name: autosnap-092206-9am
Schema: BSCHEMA

○ Include all plan cache entries
● Include plan cache entries that meet the following criteria:
  ☐ Minimum runtime for the longest execution:
    [ 0 ] [ seconds ▽ ]
  ☑ Queries run after this date and time:
    [ Sep 22, 2006 ] [ 09:00 AM ]
  ☐ Top 'n' most frequently run queries
    [ 0 ]
  ☐ Top 'n' queries with largest total accumulated runtime
    [ 0 ]
  ☐ Queries ever run by user:
    [        ]
  ☐ Queries currently active
  ☐ Queries with index advised
  ☐ Queries with statistics advised
  ☑ Include queries initiated by the operating system
  ☑ Queries that use or reference these objects:

| Schema | Table |
  |---|---|
  | bundledata | aaix1mp001 |
  |  |  |
  |  |  |

☐ SQL statement contains:
    [                    ]

1210 — [ OK ] [ Cancel ] [ Help ]

| Compare SQL Performance Data - Y0551p1 | | | _ ☐ ✕ |
|---|---|---|---|

| 1510 autosnap-09222006-8am<br>Total Statements Analyzed: 18<br>Unmatched statements: 17<br>[Show Statements] | 1520 autosnap-09222006-8am<br>Total Statements Analyzed: 21<br>Unmatched statements: 20<br>[Show Statements] |
|---|---|

| Matching Statements | 09222006-8am | 09222006-9am | percent |
|---|---|---|---|
| ⊟ select KEYFLD FROM bundledata.QQIX1MP001 XXX WHERE XXX.CHAR1 B | | | |
| • Maximum Runtime  1530 | 11.026888 | 0.112188 | 9728.93 |
| • Average Runtime | 11.026888 | 0.112188 | 9728.93 |
| • Minimum Runtime | 11.026888 | 0.112188 | 9728.93 |
| • Maximum Open Time | 11.026888 | 0.897504 | 1128.61 |
| • Maximum Fetch Time | 0.000000 | 0.000000 | 0 |
| • Maximum Close Time | 0.000000 | 0.000000 | 0 |
| • Statement Usage Count | 1 | 8 | -700.00 |
| • Average Table Scans | 1 | 1 | 0 |
| • Average Indexes Used | 0.000 | 0.000 | 0 |
| • Full Indexes Created | 0 | 0 | 0 |
| • Sparse Indexes Created | 0 | 0 | 0 |
| • Indexes from Index Created | 0 | 0 | 0 |
| • Average Index Creates Advised | 0.000 | 0.000 | 0 |
| • Average Temporary Tables | 0.000 | 0.000 | 0 |
| • Average Sorts | 0.000 | 0.000 | 0 |
| • Average Bitmap Creates | 0.000 | 0.000 | 0 |
| • Average MQTs Used | 0.000 | 0.000 | 0 |
| • Maximum Table Rows | 50000 | 50000 | 0 |
| • Maximum Estimated Rows | 6650 | 5964 | 11.50 |
| • Maximum Rows Returned | 16000 | 128000 | -700.00 |
| • Average Table Rows | 50000 | 50000 | 0 |

1540 — [Run Visual Explain]

FIG. 15

DATABASE GRAPHICAL COMPARISON TOOL

BACKGROUND

1. Technical Field

This disclosure generally relates to the database systems, and more specifically relates to tools for managing database systems.

2. Background Art

Database systems have been developed that allow a computer to store a large amount of information in a way that allows a user to search for and retrieve specific information in the database. For example, an insurance company may have a database that includes all of its policy holders and their current account information, including payment history, premium amount, policy number, policy type, exclusions to coverage, etc. A database system allows the insurance company to retrieve the account information for a single policy holder among the thousands and perhaps millions of policy holders in its database.

Retrieval of information from a database is typically done using queries. A query usually specifies conditions that apply to one or more columns of the database, and may specify relatively complex logical operations on multiple columns. The database is searched for records that satisfy the query, and those records that satisfy the query are returned as the query result. A popular query language is Structured Query Language (SQL), which has gained widespread acceptance in the database industry.

Database optimizers have been used to determine the best-performing method to run each query. A method for running a query is commonly referred to as a query access plan. Once an optimizer selects an access plan for executing a query, the optimizer typically uses the access plan each time the query is executed. Note, however, that changes over time can affect the execution time for a query using the selected access plan. The time for executing a query using a selected access plan is referred to herein as "query performance." For example, changes in the optimizer code itself when fixes are applied to the database system or when a new release is installed may affect query performance. Changes to the SQL or query statements themselves when a new version of an application or fixes to an application are deployed can also affect query performance. Changes to the resources that the optimizer has to work with may also affect query performance. For example, resources that may affect query performance include: indexes, materialized query tables created by the user, the number of rows in each table, the size of the memory pool the application is running in, etc. Any of these changes may cause the optimizer to choose a quite different, and sometimes worse, query access plan. As a result, changes to a database system may inadvertently affect query performance.

Database administrators often need to monitor database performance and determine whether database performance can be improved. Analysis tools have long been provided to allow a user to capture SQL statements and queries running in an application. Note that the term "statement" is used herein broadly to encompass any suitable database statement, including queries. These analysis tools are typically used by developers and database administrators when tuning an application prior to deployment and again after deployment to find problem queries. Ideally, a user uses these tools to capture a baseline when the application is performing well, so that later, if any variables change and negatively impact the performance of the application, the tools can be used again to capture the SQL statements. Since a before and after set of optimizer statistics are now available, it is possible to scan for the worst-performing statements in the new set of optimizer monitor information, and then look for them in the baseline results in an attempt to manually figure out what is different. Today, this process for analyzing the two sets of results is labor-intensive, time-consuming and error-prone.

One of the problems with prior art methods is that known analysis tools only allow a user to focus on one set of optimizer results at a time. Given the restrictions of these known analysis tools, users today typically search for the longest running statements in the latest monitor and then look to the baseline results. Many time, however, the problem may actually be with shorter running statements that happen to run thousands and thousands of times. This can cause the user to have to search for dozens or even hundreds of statements in both sets of optimizer monitor information before finding the set of slower running SQL statements or queries. Furthermore, some applications rely on temporary tables whose schema names are not constant and typically vary by the user. Since the names are different, it makes searching for the corresponding statements in the baseline monitor even harder. Without a way to more efficiently compare items in a database system, the computer database industry will continue to suffer from the inefficient and error-prone methods discussed above for manually identifying database problems.

BRIEF SUMMARY

A database graphical comparison tool allows comparing database items that include multiple database statements and graphically displaying the comparison results in a ranked list of statements. The graphical comparison tool includes a graphical user interface that allows a user to easily configure the tool for both manual and automatic (or scheduled) comparisons. In addition, the user may specify one or more actions that may be autonomically performed when the comparison of database items meets predefined criteria. Database items that may be compared using the database graphical comparison tool include optimizer monitors and plan cache snapshots.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and.

DETAILED DESCRIPTION

A database graphical comparison tool allows graphically comparing database items. A graphical user interface allows a user to select two or more items for comparison, such as optimizer monitors and plan cache snapshots. The comparison is performed, and the results are displayed in a ranked list of statements. The graphical user interface allows a user to easily configure the tool for both manual and automatic (or scheduled) comparisons. In addition, the user may specify one or more actions that may be autonomically performed when the comparison of database items meets predefined criteria. By providing a tool for performing comparison of database items, a database administrator is relieved of much manual effort that was required in the prior art to compare database items.

Figure 1:
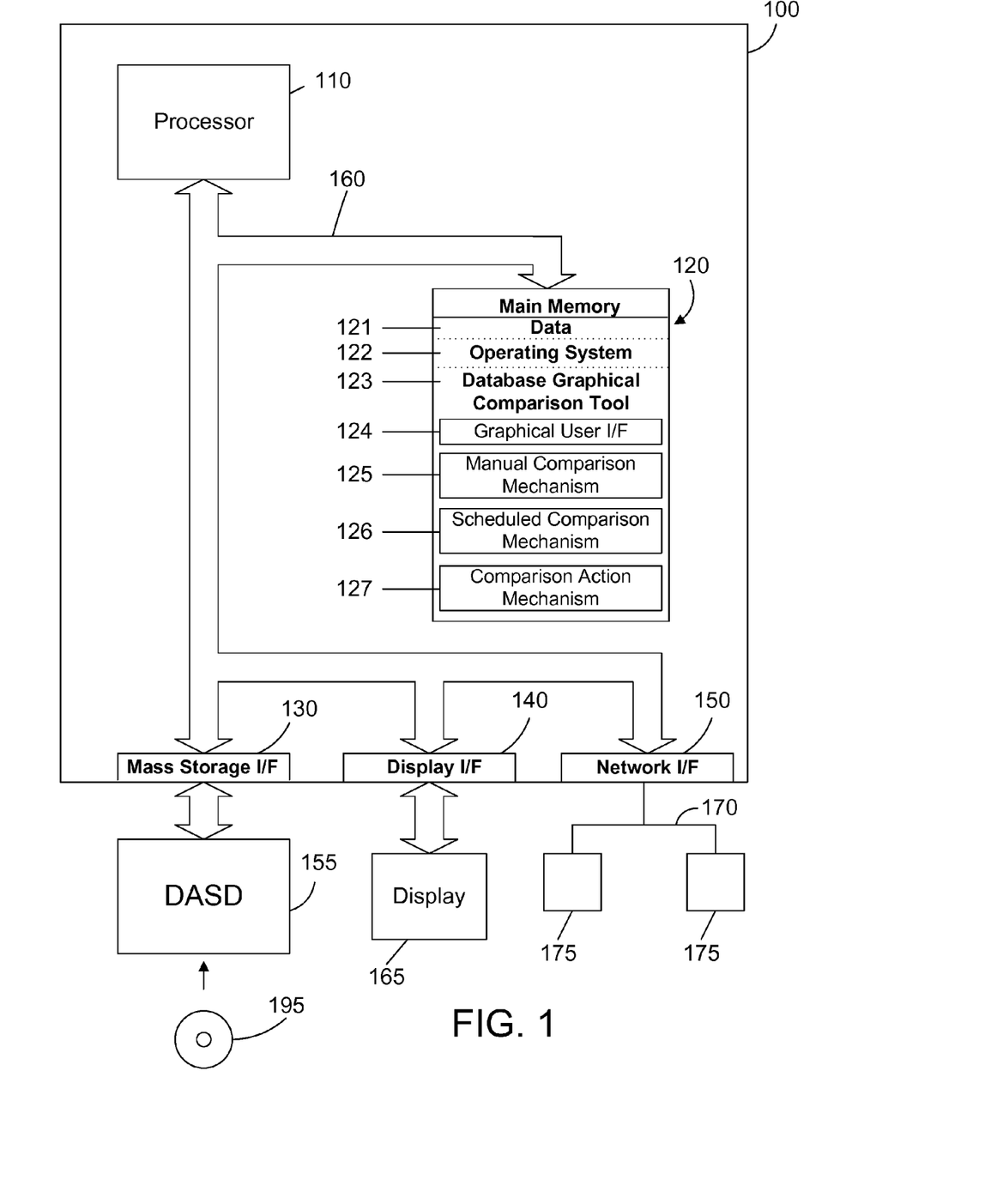
FIG. 1 is a block diagram of an apparatus that includes a database graphical comparison tool.

Referring to FIG. 1, a computer system 100 is one suitable implementation of an apparatus that performs graphical comparison of database items. Computer system 100 is an IBM eServer System i computer system. However, those skilled in the art will appreciate that the disclosure herein applies equally to any computer system, regardless of whether the computer system is a complicated multi-user computing apparatus, a single user workstation, or an embedded control system. As shown in FIG. 1, computer system 100 comprises one or more processors 110, a main memory 120, a mass storage interface 130, a display interface 140, and a network interface 150. These system components are interconnected through the use of a system bus 160. Mass storage interface 130 is used to connect mass storage devices, such as a direct access storage device 155, to computer system 100. One specific type of direct access storage device 155 is a readable and writable CD-RW drive, which may store data to and read data from a CD-RW 195.

Main memory 120 preferably contains data 121, an operating system 122, and a database graphical comparison tool 123. Data 121 represents any data that serves as input to or output from any program in computer system 100. Operating system 122 is a multitasking operating system known in the industry as i5/OS; however, those skilled in the art will appreciate that the spirit and scope of this disclosure is not limited to any one operating system. Database graphical comparison tool 123 is software that allows a database administrator or other user to easily perform comparisons of database items and display the results of the comparison. The database graphical comparison tool 123 includes a graphical user interface 124 that allows the user select two or more database items for comparison, to perform manual comparison of the selected database items, to schedule future comparison of selected database items (including periodic comparison), to define criteria for the comparison to perform one or more actions, to specify one or more actions to perform when the criteria for the comparison is satisfied, and to display comparison results in a ranked list of statements. The manual comparison mechanism 125 performs immediate comparison of two or more database items selected by the user using the graphical user interface 124. The scheduled comparison mechanism 126 performs a comparison of two or more database items selected by the user at some time in the future, or at periodic intervals. The comparison action mechanism 127 performs one or more specified actions when criteria for the comparison is satisfied. Suitable criteria include any metric that measures database performance. Suitable actions include any action that may be taken as a result of the criteria for comparison is satisfied. Examples of suitable actions include: generating a system alert to a user, sending an email or text message to a user, dynamically adding processor or hard drive resources, etc.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, and database graphical comparison tool 123 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122.

Although computer system 100 is shown to contain only a single processor and a single system bus, those skilled in the art will appreciate that graphical comparison of database items may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. Network interface 150 and network 170 broadly represent any suitable way to interconnect computer systems, regardless of whether the network 170 comprises present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the description above is in the context of a fully functional computer system, those skilled in the art will appreciate that the inbound packet filter mechanism may be distributed as a program product in a variety of forms, and that the claims extend to all suitable types of computer-readable media used to actually carry out the distribution. Examples of suitable computer-readable media include: recordable media such as floppy disks and CD-RW (e.g., 195 of FIG. 1), and transmission media such as digital and analog communications links.

Embodiments of the present invention may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

Figure 2:
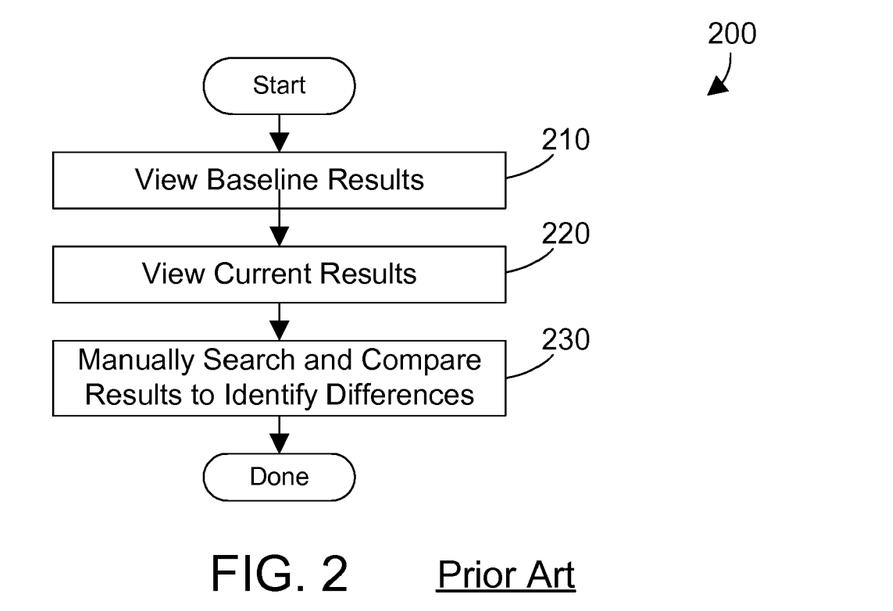
FIG. 2 is a flow diagram of a prior art method for performing manual comparison of database items.

Referring to FIG. 2, a prior art method 200 allows manually performing comparison of database items. In the prior art, baseline results are typically collected once a database application is performing well. Once the baseline results have been collected, current results may be collected and compared to the baseline results. Method 200 begins by viewing the baseline results (step 210). The current results are then viewed (step 220). The user must then manually search the baseline results and current results to identify differences between the two (step 230). Typically, the user searches for the worst-performing statements in the current results, finds the same statements in the baseline results, and compares the difference between the two. The process for analyzing the baseline results and current results and determining the differences between the two is very labor-intensive, time-consuming and error-prone.

One of the problem with the prior art method 200 is it only allows a user to focus on one set of optimizer results at a time. Given the restrictions of the existing tools, users typically have to search for the longest running statements in the current monitor and then look to the baseline results to see how they compare. Many times, however, the problem may actually be with shorter running statements that happen to run thousands and thousands of times. This can cause the user to have to search for dozens or even hundreds of statements in both sets of optimizer monitor information before finding the set of slower running SQL statements or queries. Furthermore, some applications rely on temporary tables that have schema names that are not constant and typically vary by the user. Since the names are different, it makes searching for the corresponding statements in the baseline monitor even harder.

Figure 3:
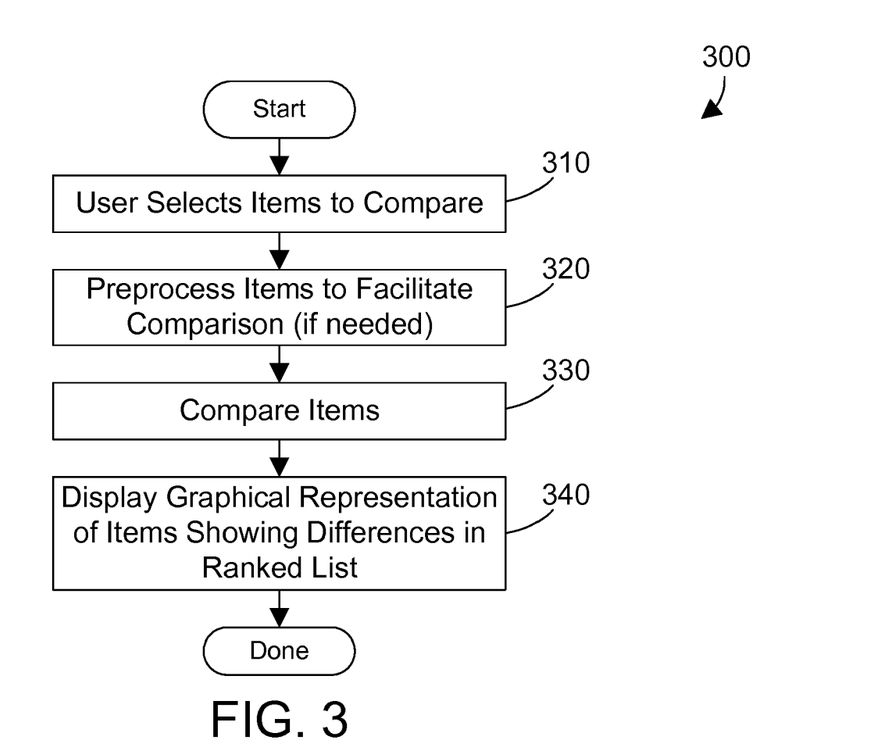
FIG. 3 is a flow diagram of a method for performing graphical comparison of database items.

Referring to FIG. 3, a method 300 in accordance with the preferred embodiments begins by a user selecting items to compare (step 310). The items are then preprocessed to facilitate comparison, if needed (step 320). One example of suitable preprocessing is the elimination of temporary table names so the statements in the two items may be more easily compared. The items are then compared (step 330). The results of the comparison are displayed in a graphical representation of items showing the differences in a ranked list (step 340). The ranked list is a valuable tool that greatly simplifies the user's task of comparing the database items, because the differences are indicated by the position of each statement in the ranked list. With the statement that has the greatest difference listed first, the user can quickly identify which statements or queries are causing problems, then take corrective action to improve the performance of the queries.

Figure 4:
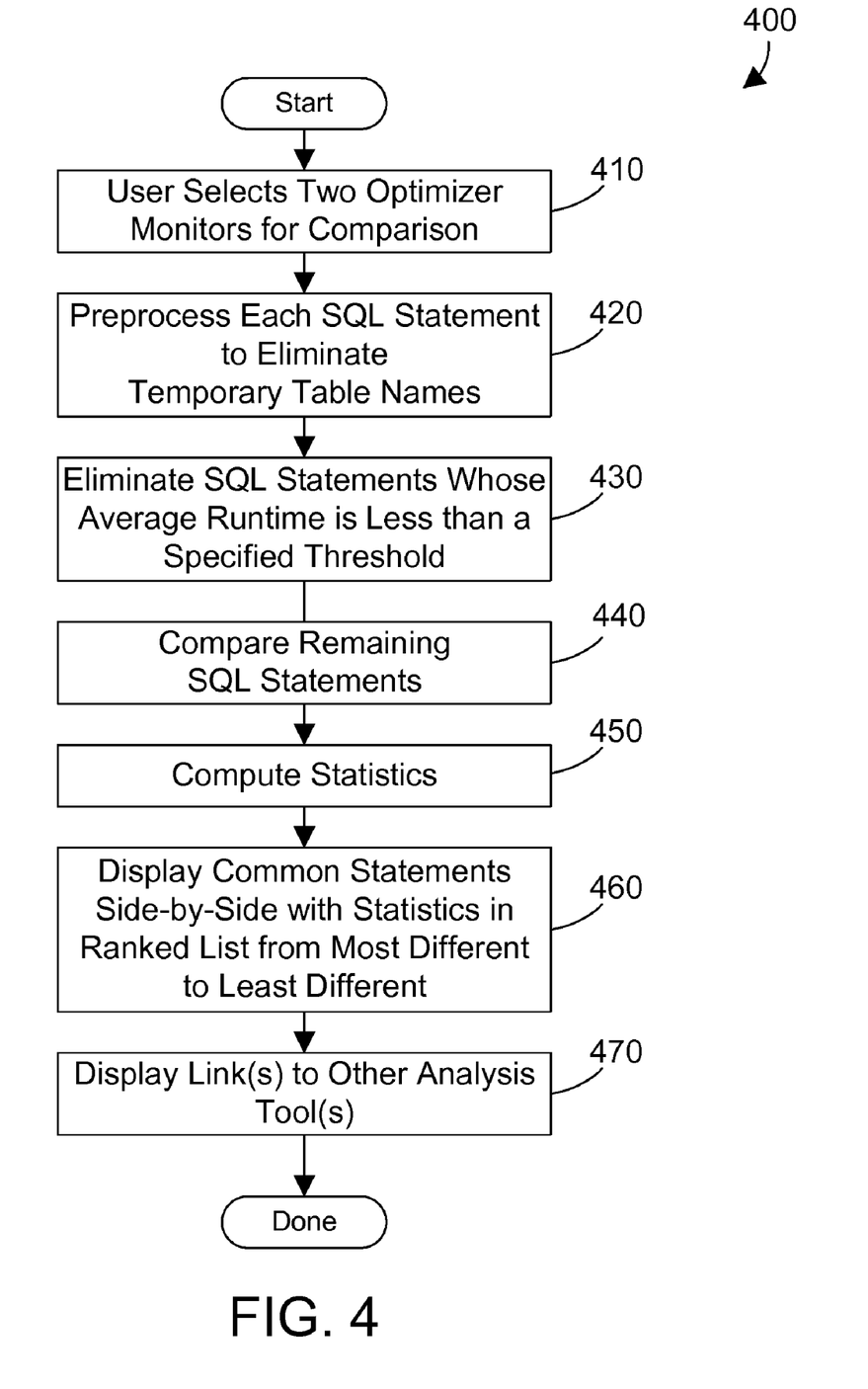
FIG. 4 is a flow diagram of a more detailed method that is one suitable example for method 300 in FIG. 3 for comparing two optimizer monitors.

Referring to FIG. 4, method 400 is one suitable example of method 300 in FIG. 3 for a specific case where two optimizer monitors need to be compared. First, the user selects two optimizer monitors for comparison (step 410), preferably using the graphical user interface 124 shown in FIG. 1. Each SQL statement and query in the two optimizer monitors are preprocessed to eliminate temporary table names (step 420). By eliminating temporary table names, the two optimizer monitors may be more easily compared. Next, SQL statements whose average runtime is less than some specified threshold are eliminated (step 430). The elimination of SQL statements in step 430 effectively eliminates non-problem SQL statements from being included in the display of the differences. The remaining SQL statements in the two optimizer monitors are compared (step 440). Statistics for the comparisons are computed (step 450). The common statements in the two optimizer monitors are then displayed side-by-side with their corresponding statistics in a list that is ranked from the most different to the least different (step 460). This side-by-side ranked display allows the user to very quickly determine significant differences between the two optimizer monitors, which allows the user to more quickly take corrective action to improve the performance of problem SQL statements. One or more links to other analysis tools may also be provided (step 470).

Figure 5:
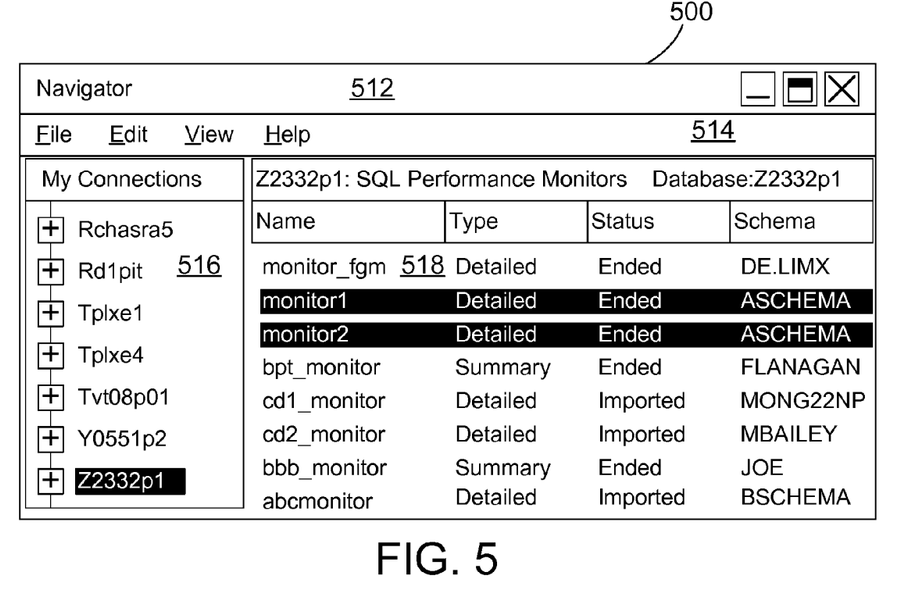
FIG. 5 is a sample graphical user interface display that allows the user to select items for comparison.
Figure 6:
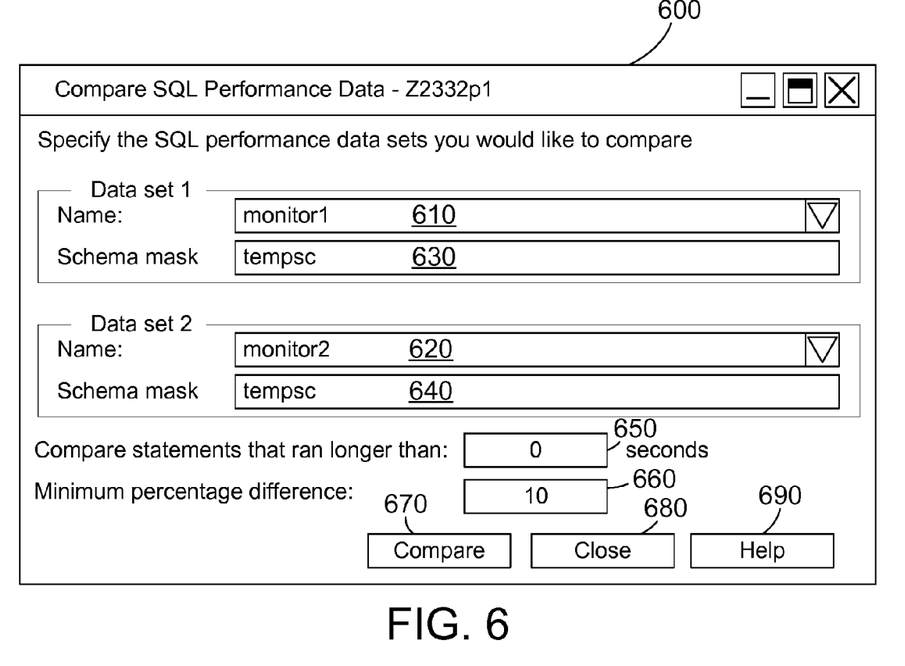
FIG. 6 is a display that allows the user to select items for comparison and to specify criteria that affects what is included in the compared results.
Figure 7:
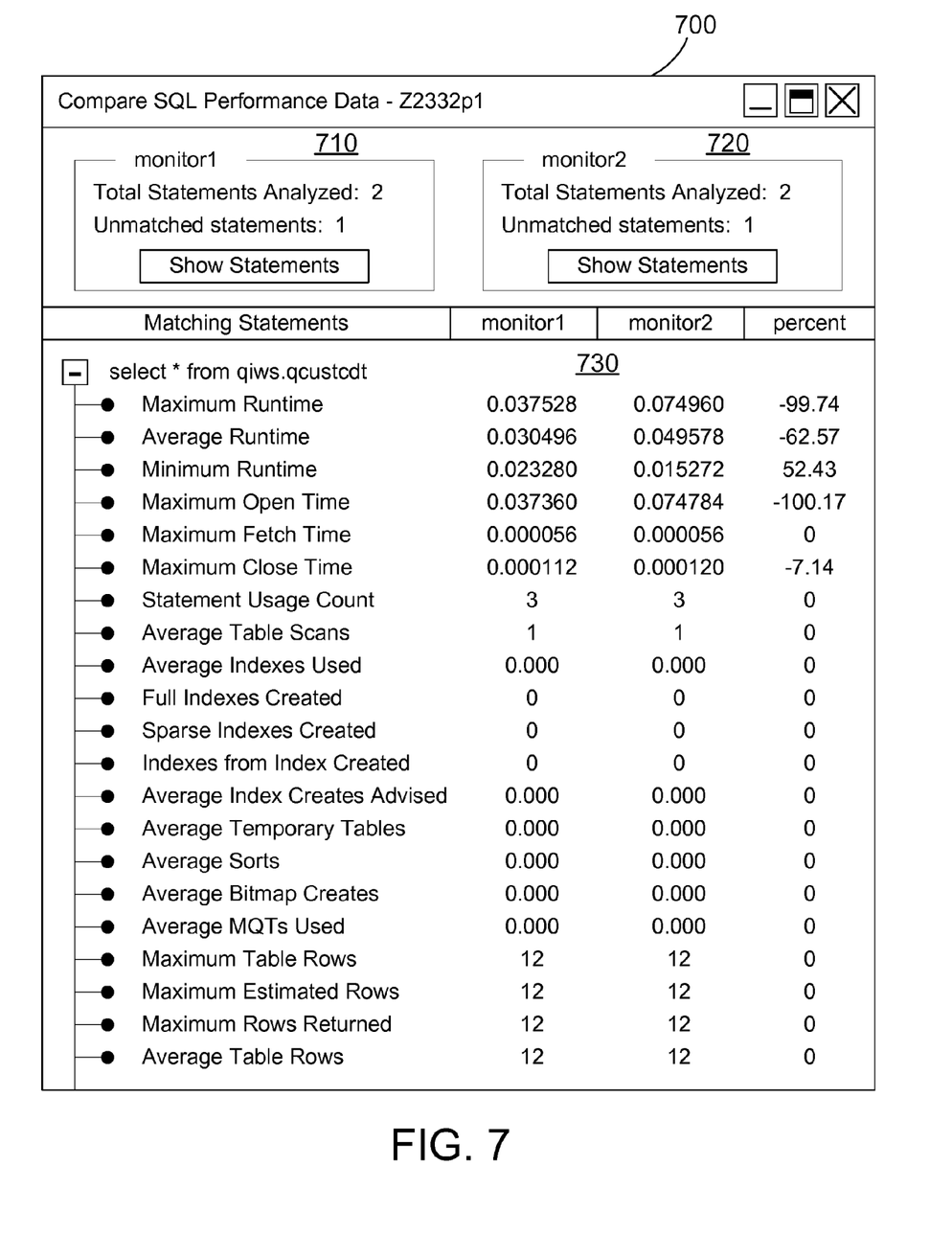
FIG. 7 is a display that shows a side-by-side comparison of database items in a ranked list of statements.

A detailed example of method 400 in FIG. 4 is now shown in FIGS. 5-7. Note that method 400 compares optimizer monitors. Optimizer monitors are well-known in the art, and typically include a log of SQL statements run by an optimizer. Referring to FIG. 5, the graphical user interface 124 in FIG. 1 provides a display panel 500 that allows the user to select two database items for comparison. Display panel 500 includes a title bar 512, a menu bar 514, a first navigator window 516 and a second navigator window 518. The first navigator window 516 shows a folder Z2332p1 that is selected (as indicated by the highlight), the contents of which are displayed in the second navigator window 518. We assume a user has selected monitor and monitor2 for comparison, as shown by these two items being highlighted in FIG. 5. Once the use selects these items, the graphical user interface presents a display panel 600 shown in FIG. 6. Display panel 600 displays the two items to be compared as datasets, with the two selected items being displayed at 610 and 620. Display panel 600 also allows the user to specify a schema mask for each of the selected items, shown at 630 and 640 in display panel 600. The schema mask allows the user to specify a name that the compare will ignore. For example, let's assume an application is running in a test schema, and is optimized. The application is then moved to the production schema, and the user wants to compare how the application executes in the production schema compares to the test schema. The statements in the two monitors would be identical except the statements in the test schema uses "TEST" and the statements in the production schema use "PROD". The schema mask could be used to ignore "TEST"

in the first monitor and to ignore "PROD" in the second monitor so that the statements in the two monitors appear identical for the comparison.

The user may also specify criteria that can filter statements that run less than a specified threshold time at 650, and to specify a minimum percentage difference to be displayed at 660. In the example in FIG. 6, the schema mask for the two optimizer monitors is the same, namely tempsc, as shown at 630 and 640. In this example, the user specifies to compare statements that run longer than zero seconds at 650, which means all statements will be compared. The user also specifies a minimum percentage difference of 10 percent at 660, which means only those differences greater than 10 percent will be displayed to the user. Once the user has specified the schema mask at 630 and 640, the comparison threshold at 650 and the minimum percentage difference at 660, the user may click on the "Compare" button 670, which causes the database graphical comparison tool to perform the comparison. In the alternative, the user may click on the "Close" button 680 to close display panel 600 or may click on the "Help" button 690 to receive context-sensitive help, as is known in the GUI art.

Once the user clicks on the "Compare" button 670 in FIG. 6, the database graphical comparison tool performs any required preprocessing to eliminate temporary table names, performs the comparison, and displays the results according to the criteria specified in display panel 600. A sample display panel 700 is shown in FIG. 7. Display panel 700 includes two headers 710 and 720 that show information relating to each of the two optimizer monitors being compared. For example, header 710 shows that monitor has two total statements analyzed and 1 unmatched statements. Header 720 shows that monitor2 has two total statements analyzed and 1 unmatched statements. Display panel 700 also includes a display panel 730 that displays the differences between the two items to the user. Note that display panel 730 may not include all statements because the user can specify a compare threshold at 650 in FIG. 6 that effectively filters out or excludes statements that run less than the specified threshold time, and the display panel 730 will not include statements that have a percentage difference that is less than the specified percentage different threshold shown at 660 in FIG. 6. We see from display panel 730 in FIG. 7 that all of the displayed items relate to a single SQL statement, namely "select * from qiws.qcustcdt". The Maximum Runtime between the two monitors has a −99.74 percent difference. The 99.74 indicates the magnitude of the change, while the sign indicates whether the change is better (positive) or worse (negative). Note that only the magnitude is considered in presenting the list of ranked results. The −99.74 percent difference in the maximum runtime between these two monitors shows the maximum runtime has almost doubled between the two monitors. If monitor1 represents baseline results that were taken when the application was working properly and monitor2 represents current results, this means the maximum runtime for this SQL statement has almost doubled, resulting in decreased performance for this query. The Average Runtime has a difference of −62.57. The Minimum Runtime has a difference of 52.43, which is an improvement from monitor 1 to monitor 2. The Maximum Open Time is −100.17, the Maximum Fetch Time is zero, and the Maximum Close Time is −7.14. All of the other compared items have no difference, as shown by the zeroes in the percent column in display panel 730 in FIG. 7.

Note that the ranked list refers to the ranking of statements in the list, and not necessarily to the ranking of measured parameters for a particular statement. In this example, we assume the ranking is performed based on the Maximum Runtime for each statement. As a result, the statement with the greatest percentage difference in Maximum Runtime will be placed first in the ranked list; the statement with the second greatest percentage difference in Maximum Runtime will be placed second in the ranked list; and so on until the statement with the smallest percentage difference in Maximum Runtime will be placed last in the ranked list. The measured parameters for each statement may be displayed in any suitable order or arrangement, such as that shown in FIG. 7. Only one statement is shown in FIG. 7, which we assume is the first statement, which is the statement with the greatest percentage difference in Maximum Runtime. We assume other statements are also included in the ranked list which are not shown in FIG. 7. We further assume for this example that any statement that has any difference in its measured parameters that is greater than ten percent will be included in the ranked list (due to the user specifying 10 in field 660 in FIG. 6). Thus, only those statements which have no parameters greater than ten percent different will be excluded from the ranked list.

Figure 8:
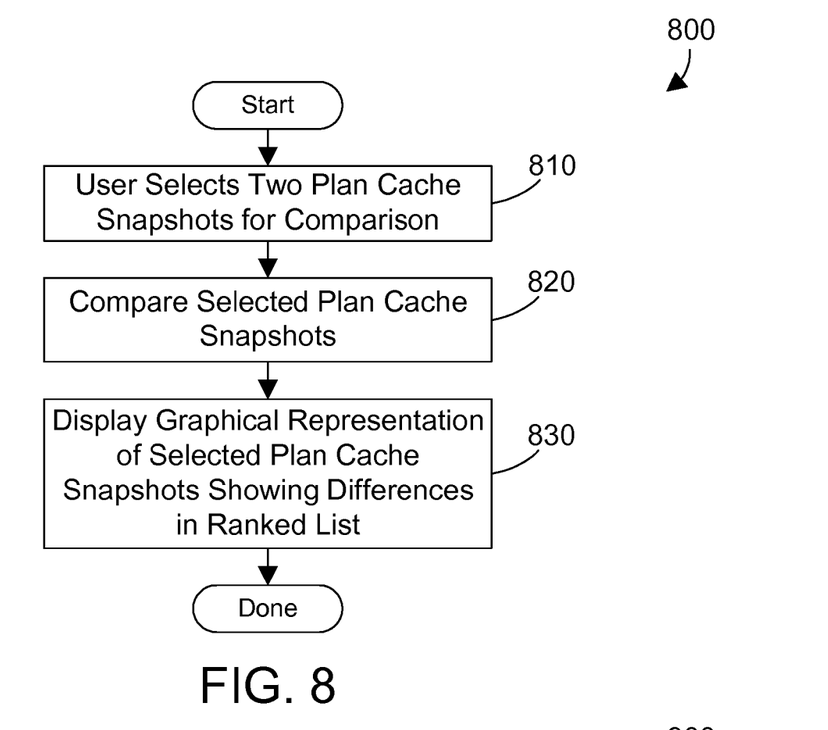
FIG. 8 is a flow diagram of a method for a user to compare two plan cache snapshots.

Referring to FIG. 8, a method 800 represents one suitable implementation for method 300 in FIG. 3 for comparing two cache plan snapshots. A cache plan snapshot is a type of database monitor file generated from the plan cache. A user selects two plan cache snapshots for comparison (step 810), preferably using the graphical user interface 124 shown in FIG. 1. The selected plan cache snapshots are then compared (step 820), and the results are displayed graphically showing the differences in a ranked list (step 830). Method 800 could be performed, for example, by the manual comparison mechanism 125 in FIG. 1. In addition to performing comparisons immediately (or manually) when specified by the user, a user may also schedule plan cache snapshots and comparison of plan cache snapshots in the future, as shown in method 900 in FIG. 9. A user schedules plan cache snapshots (step 910). The user then selects two plan cache snapshots for periodic comparison (step 920). The user could instead specify a one-time schedule comparison at a future time. The user may also optionally define one or more actions to perform when specified criteria in the comparison results are satisfied (step 930). For example, in step 930 the user could specify to notify a user via email of a warning message if the Average Runtime for two SQL statements are more than 50% different. Of course, other actions could be taken based on other criteria in the comparison results (or statistics).

Figure 9:
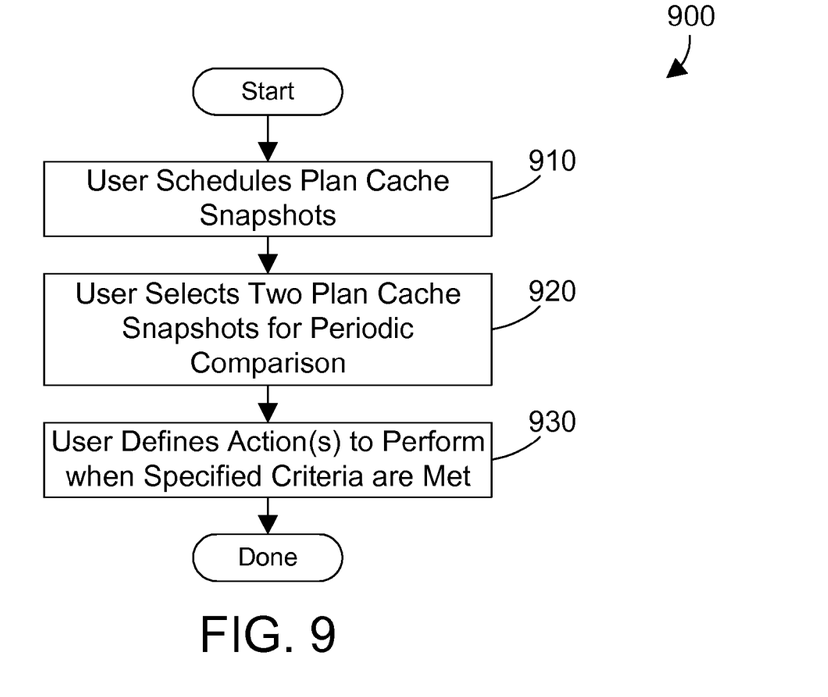
FIG. 9 is a flow diagram of a method for a user to schedule automatic comparison of two plan cache snapshots and to define one or more actions to perform when specified comparison criteria are met.
Figure 10:
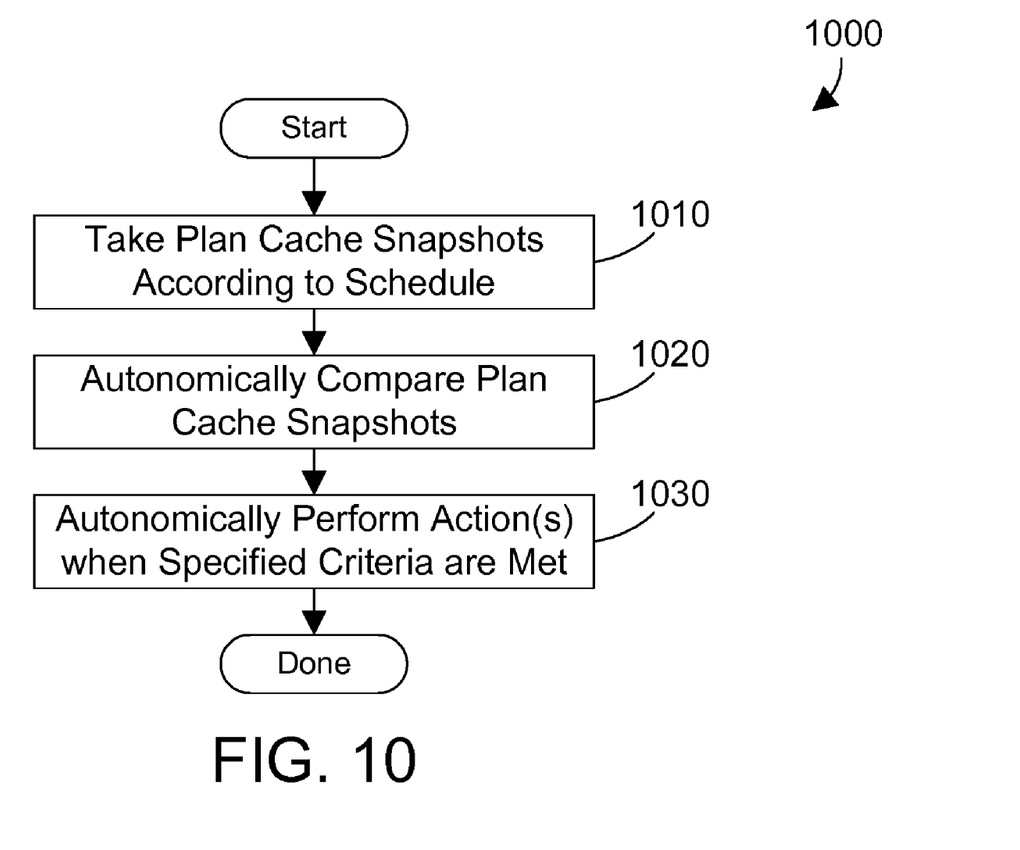
FIG. 10 is a flow diagram of a method for performing automatic comparison of two plan cache snapshots and to autonomically perform the one or more actions when the specified comparison criteria are met.

Method 1000 in FIG. 10 shows steps that may be autonomically performed once the user performs the steps in method 900 in FIG. 9. The plan cache snapshots are taken according to the schedule in step 910 in FIG. 9 (step 1010). The plan cache snapshots selected by the user in step 920 in FIG. 9 are autonomically compared (step 1020). If the user defined one or more actions to perform when specified criteria in the comparison results were met in step 930 in FIG. 9, the defined actions are autonomically performed when the specified criteria are met (step 1030). Thus, for the example given above, if the Average Execution Time for two SQL statements in the two plan cache snapshots are more than 50% different in the comparison in step 1020, an email is sent to the user in step 1030 with a warning message notifying the user of this difference.

Figure 11:
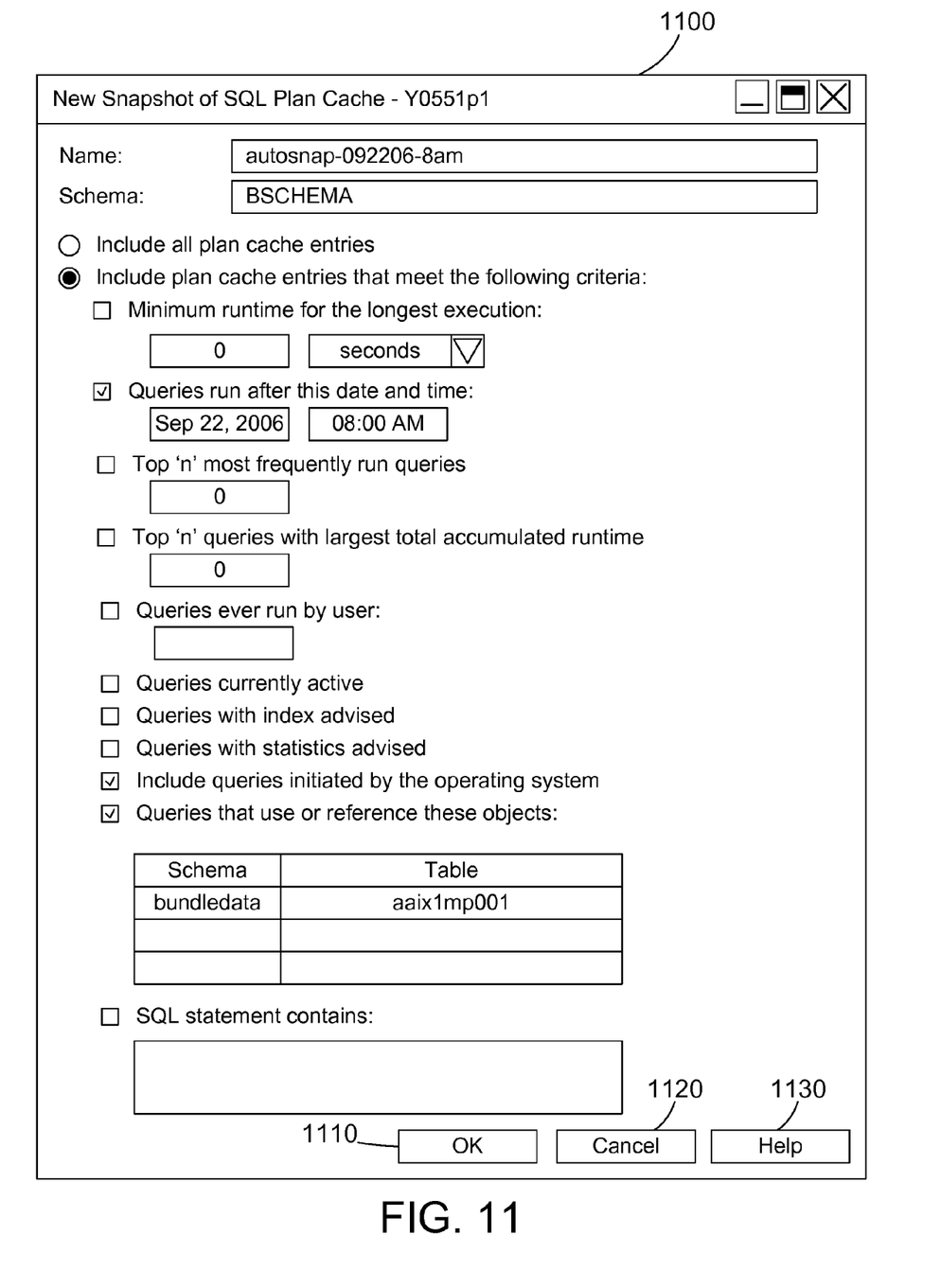
FIG. 11 is a display that allows defining a first plan cache snapshot.

A detailed example is now provided in FIGS. 11-15 to illustrate methods 800, 900 and 1000 shown in FIGS. 8, 9 and 10, respectively. Referring to FIG. 11, a display panel 1100 illustrates a display that could be provided by the graphical user interface 124 in FIG. 1 for a user to define a plan cache snapshot. We assume for this example the first plan cache snapshot defined by the user is named autosnap-092206-8 am, and has a schema named BSCHEMA. The user may specify to include all plan cache entries, or may include only those plan cache entries that meet specified criteria. For the example in FIG. 11, the user has clicked on the radio button to include plan cache entries that meet specified criteria, which includes queries run after Sep. 22, 2006 at 8:00 AM, includes queries initiated by the operating system, and includes queries that use or reference the aaix1mp001 table having a schema of bundledata. Once the user is satisfied with the settings in the panel 1100, the user clicks on the "OK" button 1110 to save this snapshot, or may alternatively click on the "Cancel" button 1120 or "Help" button 1130, which are GUI functions that are well-known in the art.

Figure 12:
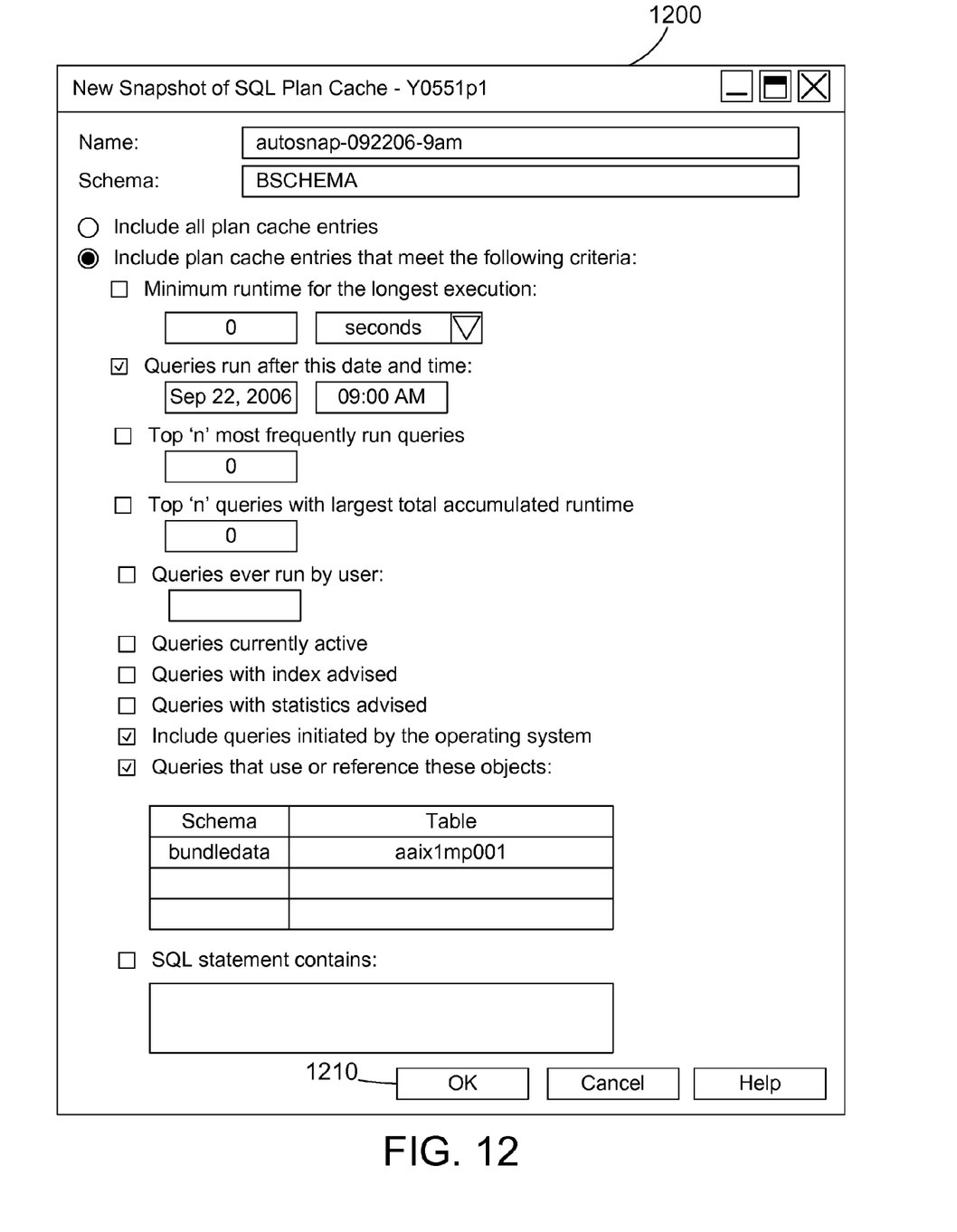
FIG. 12 is a display that allows defining a second plan cache snapshot.
Figure 13:
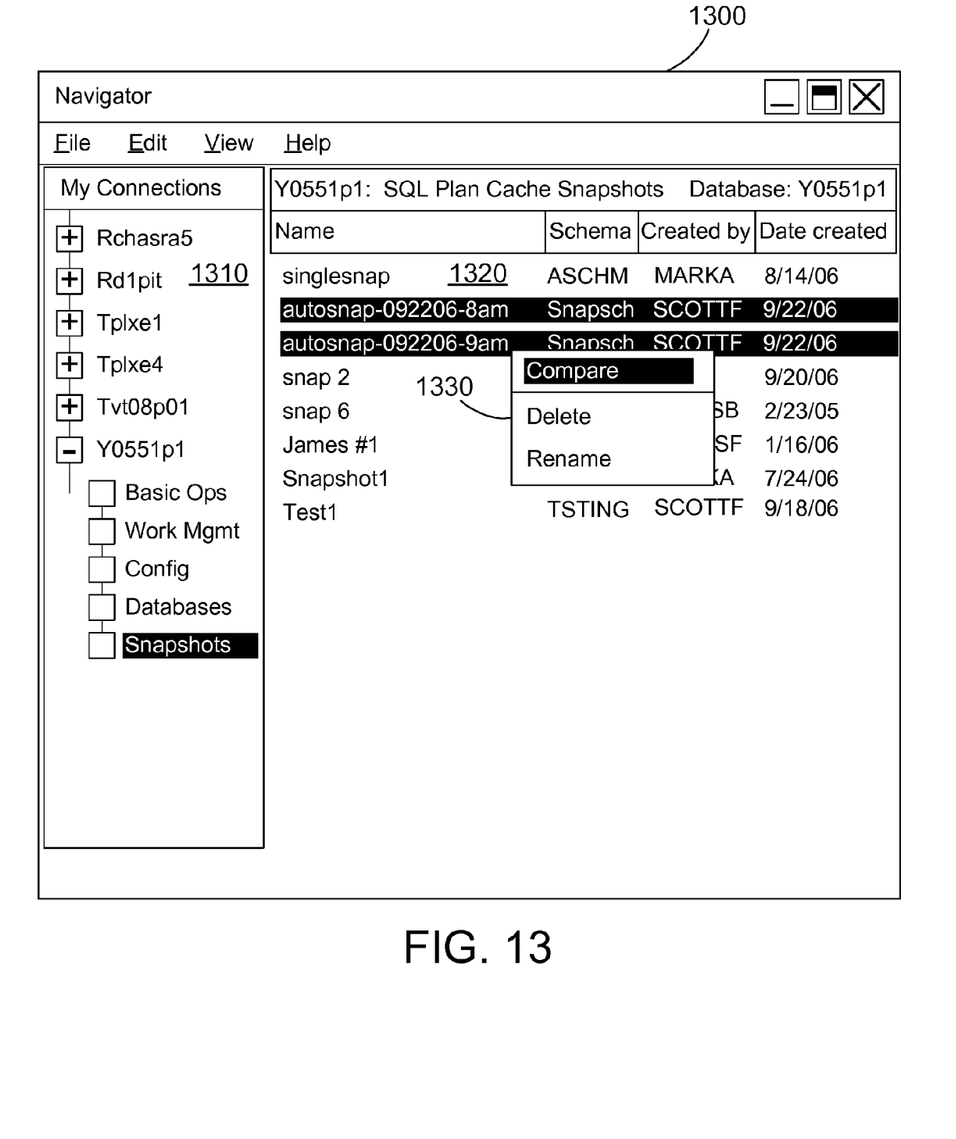
FIG. 13 is a display that allows a user to select two plan cache snapshots for comparison.

FIG. 12 shows another display panel 1200 that is displayed to a user to define a new snapshot called autosnap-092206-9 am, with a schema of BSCHEMA. The same criteria are specified for this snapshot as for the previous snapshot in FIG. 11. The user then clicks the "OK" button 1210 to save this snapshot. Now that these two snapshots have been defined, the user may select these two snapshots for comparison using the graphical user interface, as shown in display panel 1300 in FIG. 13. We assume a user selects the Snapshots directory shown in the first navigator panel 1310 as shown in FIG. 13. We also assume the user selects the two snapshots created in FIGS. 11 and 12 for comparison, as shown by these two being highlighted in the second navigator panel 1320 shown in FIG. 13. We then assume the user invokes a menu function to compare these two snapshots as shown by menu panel 1330.

Figure 14:
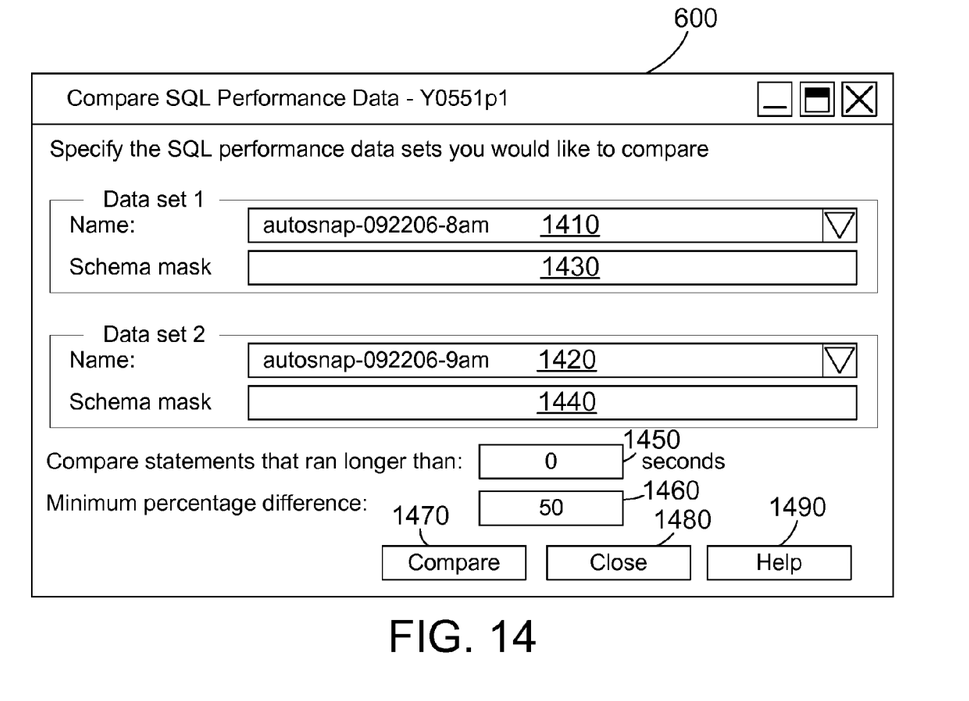
FIG. 14 is a display that allows the user to select items for comparison and to specify criteria that affects what is included in the compared results.

By invoking the Compare menu function in display panel 1330 in FIG. 13, the display panel 1400 in FIG. 14 is displayed to the user. Note this is very similar to the display panel 600 shown in FIG. 6. The difference is that plan cache snapshots are being compared instead of optimizer monitors. The selected plan cache snapshots are shown in fields 1410 and 1420, and no schema masks are specified in fields 1430 and 1440. We assume the user specifies zero seconds in field 1450 and 50 percent minimum percentage difference in field 1460. The user then clicks on the "Compare" button 1470 to accept the items specified in this display panel. In the alternative, and user may click the "Close" button to close the display panel 1400, or may click the "Help" button 1490 to display context-sensitive help, as is well-known in the GUI art.

Figure 15:
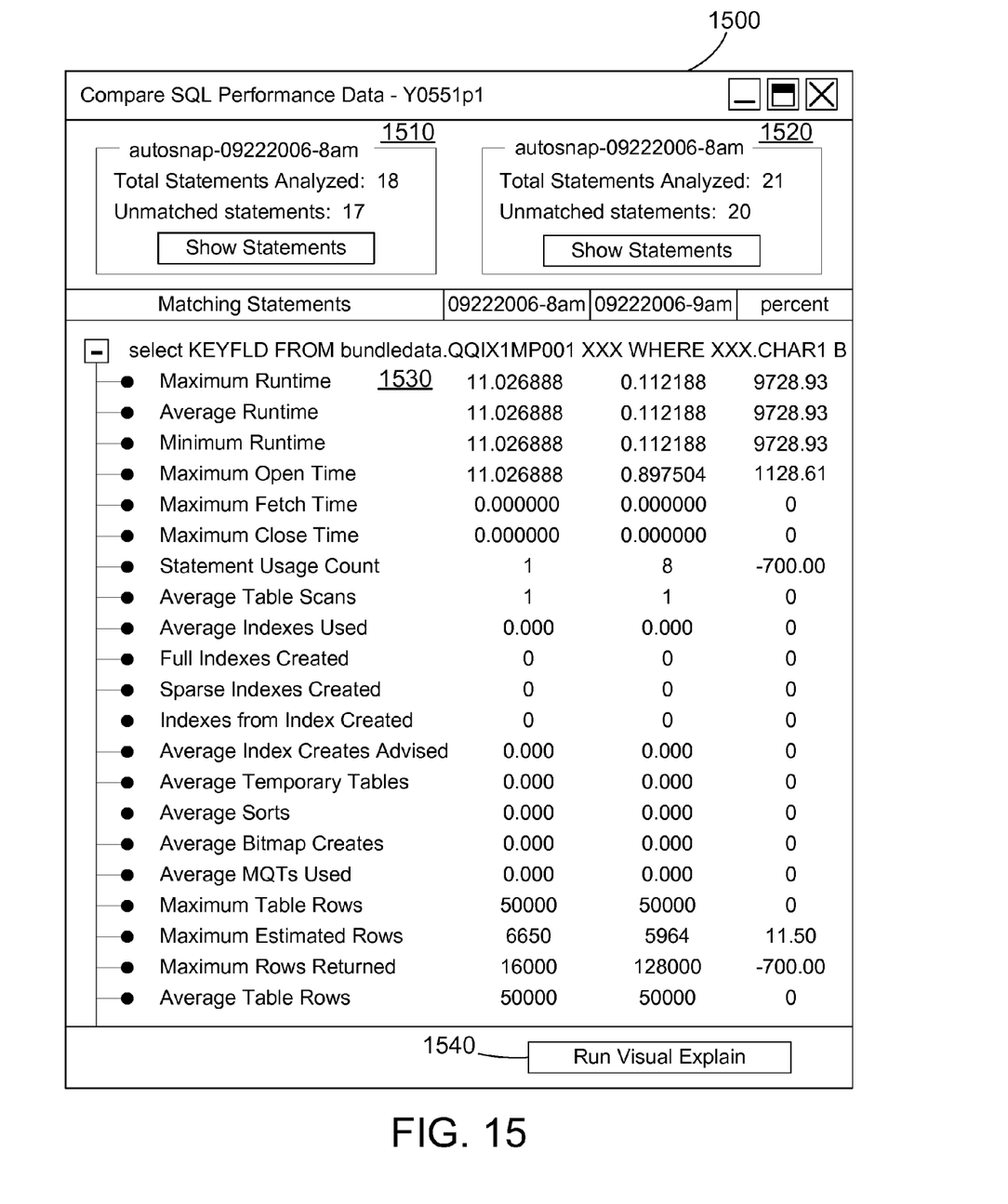
FIG. 15 is a display that shows a side-by-side comparison of database items in a ranked list of statements.

When the user clicks on the "Compare" button 1470 in FIG. 14, the two plan cache snapshots are compared, with the results displayed in the display panel 1500 shown in FIG. 15. Display panel 1500 includes headers 1510 and 1520 that show statistics for the two snapshots being compared. The matching statements are then shown in display panel 1530 in a ranked list, with the greatest differences being first in the ranked list. We see the maximum runtime has a 9728.93 percent change from the 8 am snapshot to the 9 am snapshot. Similar percentage changes are shown for the Average Runtime and the Minimum Runtime. The Maximum Open Time changed by 1128.61 percent, while the Statement Usage Count shows a -700.00 percent change. The Maximum Rows Returned has a change of 11.50 percent, while the Maximum Rows Returned has a change of -700.00 percent. All other items in the display panel 1530 shown zero percent change.

Note that display panel 1500 also includes one or more buttons, such as button 1540, that allows the user to invoke one or more other database analysis tools. For example, a graphical analysis tool for databases known as Visual Explain may be invoked by clicking on the button 1540. By providing links to one or more other analysis tools, the user of the database graphical comparison tool 123 may easily access other tools to help gain a better understanding of the performance of a database and what actions should be taken to improve performance of the database.

The database graphical comparison tool disclosed herein allows for a user to easily compare items in a database. A graphical user interface allows the user to select which items to compare, to specify criteria for the comparison, and for displaying the comparison results in a ranked list of comparison statistics. The user may also schedule a comparison in the future, and/or may schedule periodic comparisons. By displaying the comparison results in the ranked list of comparison statistics, the user may easily identify problems and take appropriate corrective action to improve database performance.

The disclosure herein and claims refer to a ranked list. The ranked list is a ranking of SQL statements in the list according to some measured metric that applies to each statement and query. For the examples herein, the metric used to rank the SQL statements in the list is Maximum Runtime. The other metrics that apply to each statement and query may be listed in a defined sequence for each statement, or can also be ranked. The disclosure and claims herein expressly extend to any suitable way to rank SQL statements according to a selected metric.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

What is claimed is:

1. A method for comparing at least two database items, the method comprising the steps of:
    providing a graphical user interface that allows a user to select the at least two database items for comparison, each database item including a plurality of database statements;
    eliminating database statements in the at least two database items that have an average runtime less than a specified threshold;
    comparing the at least two database items; and
    displaying results of the comparison in a graphical format in a ranked list of database statements, the ranked list further including for each database statement in the ranked list: maximum open time, maximum fetch time, maximum close time, statement usage count, average table scans, average indexes used, full indexes created, sparse indexes created, indexes from index created, average index creates advised, average temporary tables, average sorts, average bitmap creates, average materialized query tables used, maximum table rows, maximum estimated rows, maximum rows returned, and average table rows.

2. The method of claim 1 wherein the graphical user interface allows a user to schedule comparison of at least two database items at a future time.

3. The method of claim 1 wherein the graphical user interface allows a user to specify at least one action for the database graphical comparison tool to take when at least one comparison criterion is satisfied.

4. The method of claim 1 wherein the at least two database items comprise database optimizer monitors.

5. The method of claim 1 wherein the at least two database items comprise database plan cache snapshots.

6. A method for deploying computing infrastructure, comprising integrating computer readable code into a computing system, wherein the code in combination with the computing system perform the method of claim 1.

7. The method of claim 1 wherein the ranked list of database statements includes maximum runtime, average runtime and minimum runtime for each database statement in the ranked list.

8. A method for comparing two database optimizer monitors, the method comprising the steps of:

provid­ing a graphical user interface that allows a user to select the two database optimizer monitors for comparison and to specify at least one action to take when at least one comparison criterion is satisfied, each database optimizer monitor including a plurality of database statements;

eliminating database statements in the two database optimizer monitors that have an average runtime less than a specified threshold;

comparing the two database optimizer monitors; and displaying results of the comparison in a graphical format in a ranked list of database statements, the ranked list including maximum runtime, average runtime, minimum runtime, maximum open time, maximum fetch time, maximum close time, statement usage count, average table scans, average indexes used, full indexes created, sparse indexes created, indexes from index created, average index creates advised, average temporary tables, average sorts, average bitmap creates, average materialized query tables used, maximum table rows, maximum estimated rows, maximum rows returned, and average table rows for each database statement in the ranked list.

9. A method for comparing two database plan cache snapshots for a database, the method comprising the steps of:

providing a graphical user interface that allows a user to select the two database plan cache snapshots for comparison and to specify at least one action to take when at least one comparison criterion is satisfied, each database plan cache snapshot including a plurality of database statements;

eliminating database statements in the two database plan cache snapshots that have an average runtime less than a specified threshold;

comparing the two database plan cache snapshots; and displaying results of the comparison in a graphical format in a ranked list of database statements, the ranked list including maximum runtime, average runtime, minimum runtime, maximum open time, maximum fetch time, maximum close time, statement usage count, average table scans, average indexes used, full indexes created, sparse indexes created, indexes from index created, average index creates advised, average temporary tables, average sorts, average bitmap creates, average materialized query tables used, maximum table rows, maximum estimated rows, maximum rows returned, and average table rows for each database statement in the ranked list.

\* \* \* \* \*